United States Patent [19]
Kannankeril et al.

[11] Patent Number: 5,665,456
[45] Date of Patent: Sep. 9, 1997

[54] HEAT-SHRINKABLE FLEXIBLE CUSHIONING MATERIAL AND METHOD OF FORMING THE SAME

[75] Inventors: Charles P. Kannankeril, North Caldwell, N.J.; Lawrence J. Pillote, Naperville, Ill.

[73] Assignee: Sealed Air Corporation, Saddle Brook, N.J.

[21] Appl. No.: 568,308

[22] Filed: Dec. 6, 1995

[51] Int. Cl.$^6$ ........................................ B32B 3/12
[52] U.S. Cl. .................. 428/178; 428/166; 428/172; 156/209; 156/244.13; 156/306.6; 156/308.4
[58] Field of Search ........................ 428/178, 166, 428/172; 156/244.17, 209, 244.13, 306.6, 308.4, 295; 206/521

[56] References Cited
U.S. PATENT DOCUMENTS

| | | | |
|---|---|---|---|
| 4,314,865 | 2/1982 | Ottaviano | 428/178 |
| 4,386,128 | 5/1983 | Yoshikawa | 428/178 |
| 5,143,775 | 9/1992 | Olsson et al. | 428/178 |
| 5,196,254 | 3/1993 | Akiyama | 428/178 |

*Primary Examiner*—Donald Loney
*Attorney, Agent, or Firm*—Bell, Seltzer, Park & Gibson, P.A.

[57] ABSTRACT

A heat-shrinkable flexible cushioning material and method of forming the same in which an air bubble protective packaging is formed of first and second layers of thermoplastic film laminated together to define a multiplicity of spaced apart air bubbles therein, and a layer of heat-shrinkable film is laminated to one of the outside surfaces of the air bubble protective packaging.

17 Claims, 2 Drawing Sheets

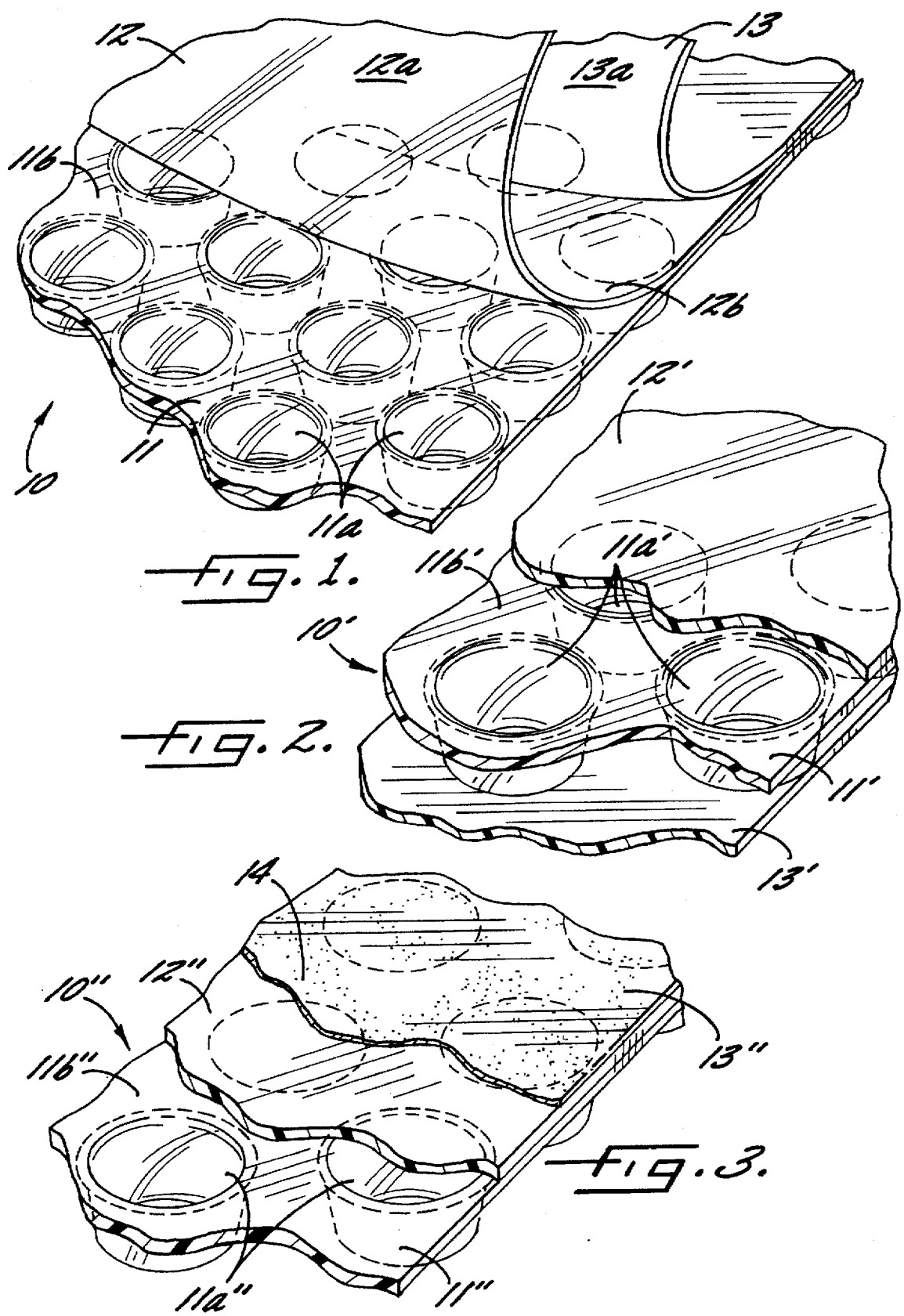

HEAT-SHRINKABLE FLEXIBLE CUSHIONING MATERIAL AND METHOD OF FORMING THE SAME

FIELD OF THE INVENTION

This invention relates to flexible cushioning materials and a method of forming the same.

BACKGROUND OF THE INVENTION

Flexible cushioning materials for cushioning and protecting articles during handling and shipment are in widespread use. A particularly popular form of such flexible cushioning material is a wrapping material consisting of laminated layers of plastic film having a multiplicity of spaced apart, air filled bubbles therein.

While providing excellent cushioning characteristics and being a relatively low-cost cushioning material, such cushioning material does have certain disadvantages and deficiencies. Because of the air filled bubbles, it is difficult to wrap the cushioning material about an article and hold the cushioning material in place to enclose tightly the article. Such difficulty is compounded when articles of irregular shapes and contours are being wrapped and packaged.

It is known that heat-shrinkage plastic film can be wrapped about an article or articles and then heated to shrink the same to enclose tightly the article or articles. It has been previously attempted to provide a heat-shrinkable air bubble protective packaging material by applying a heat-shrinkable plastic film to one surface of the air bubble material and mechanically pressing the heat-shrinkable film thereagainst. Because such a combination relies solely on surface attraction or surface tension to maintain the heat-shrinkable film on the air bubble material, dislodgement or separation of the heat-shrinkable film from the air bubble material prior to and during wrapping thereof around articles frequently occurs and therefore this attempt has been generally unsuccessful.

SUMMARY OF THE INVENTION

With the foregoing in mind, it is an object of the present invention to provide a heat-shrinkable flexible cushioning material and method of forming the same which overcomes the aforementioned problems, disadvantages and deficiencies.

This object of the present invention is accomplished by providing an air bubble protective packaging material to which a layer of heat-shrinkable plastic film is laminated. Preferably, the heat-shrinkable layer is heat-laminated to the air bubble protective packaging material in such manner that premature shrinkage is avoided. The heat-shrinkable layer may be adhesively laminated to the air bubble protective packaging material, but such adhesive lamination is less preferred because of processing and cost considerations.

Typically, air bubble protective packaging materials have two major surfaces, one being defined by the apogees or perigees of air bubbles and the other being substantially flat. The heat-shrinkable layer may be laminated to either of these surfaces, although the substantially flat surface is most preferred.

In accordance with a preferred embodiment of the method of the present invention, the heat-shrinkable flexible cushioning material is formed by coextruding the first and second layers of plastic film while forming the multiplicity of air bubbles therein as generally disclosed in U.S. Pat. No. 5,116,444, assigned to the assignee of this application. Immediately after formation of the air bubbles, the heat-shrinkable layer is brought into contact with the exposed surface of the air bubble protective packaging material while there is sufficient residual heat in that surface to cause the heat-shrinkable layer to laminate thereto. To prevent premature shrinkage of the heat-shrinkable layer, the obverse surface of the heat-shrinkable layer is cooled so that the residual heat from the air bubble material will not penetrate into the heat-shrinkable layer and cause the same to shrink.

BRIEF DESCRIPTION OF THE DRAWINGS

Some of the objects having been stated, other objects will appear as the description proceeds, when taken in connection with the accompanying drawings in which FIG. 1 is a fragmentary perspective view of the heat-shrinkable flexible cushioning material of the present invention with portions peeled back for clarity of illustration;

FIG. 2 is a view similar to FIG. 1 of another embodiment of the present invention;

FIG. 3 is a view similar to FIG. 1 of still another embodiment of the present invention;

DETAILED DESCRIPTION OF THE ILLUSTRATED EMBODIMENTS

Figure 4:
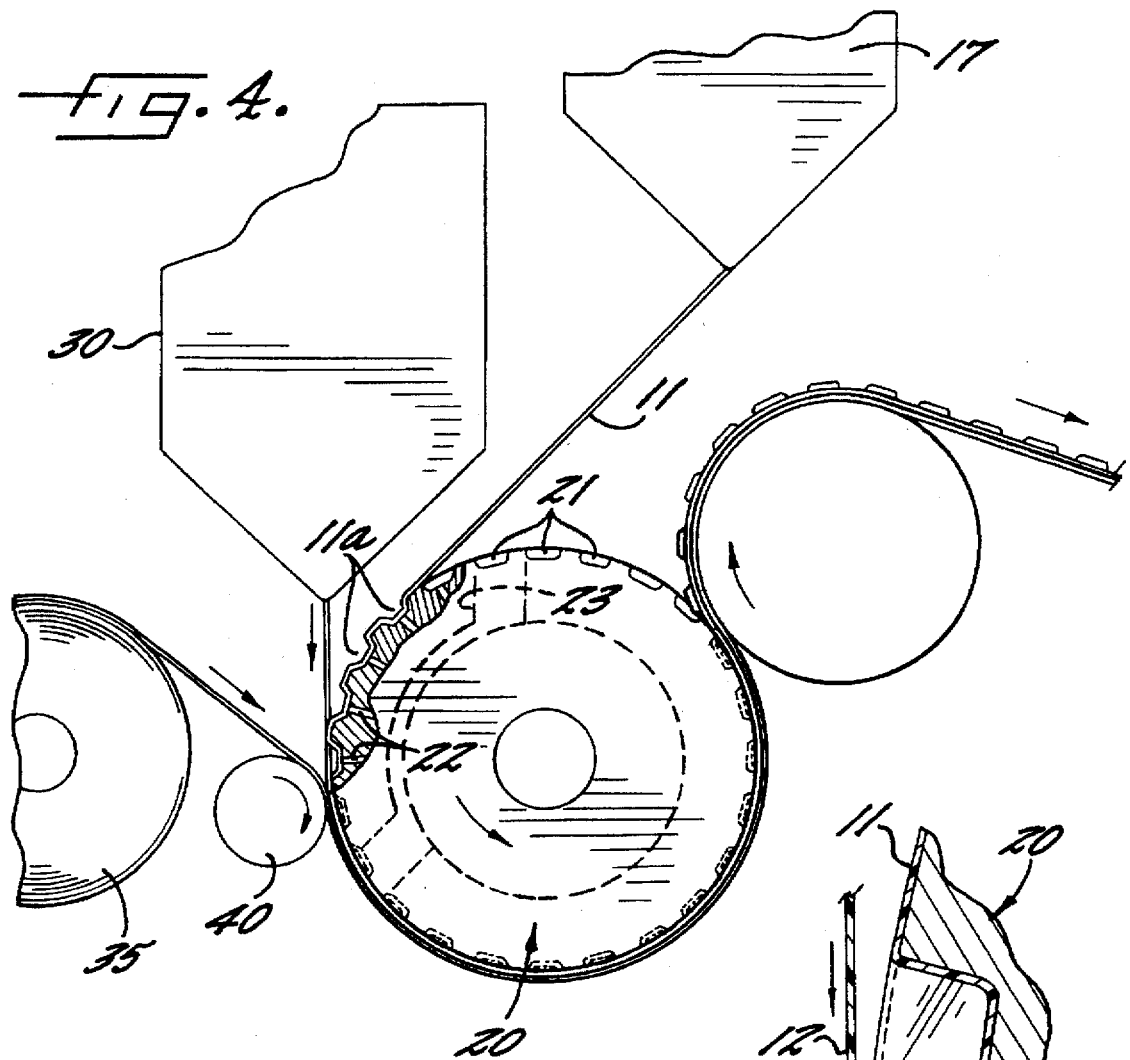
FIG. 4 is a somewhat schematic side elevational view, partially in section, of the preferred embodiment of the method of the present invention.

Referring now more particularly to the drawings and specifically to FIG. 1, there is illustrated a heat-shrinkable flexible cushioning material generally indicated at 10. Cushioning material 10 includes a first layer 11 of plastic film in which are formed a plurality of spaced apart concave cavities 11a which have openings thereinto in a first major surface 11b of layer 11. A second layer 12 of plastic film is superposed onto layer 11 and has a first major surface 12a thereof laminated to the first major surface 11b of layer 11 over the land areas between and around the cavities 11a. First and second layers 11 and 12 form a cushioning material commonly referred to as air bubble protective packaging. Air bubble protective packaging is manufactured by a number of different manufacturers including Sealed Air Corporation, the assignee of this application.

Layers 11 and 12 may be formed of any suitable thermoplastic film. It has been determined that layers 11 and 12 should preferably be formed of a barrier thermoplastic film for best results upon heat-shrinkage of the cushioning material 10. Such barrier films are well-known and commercially available. Examples of air bubble protective packaging formed of such barrier film are AIR-CAP® and POLY-CAP® manufactured by Sealed Air Corporation.

A layer 13 of heat-shrinkable plastic film is superposed onto second layer 12 and has a first major surface 13a thereof laminated to a second major surface 12b of the second layer 12 over at least portions of the contiguous surfaces 12b and 13a. Preferably, layer 13 is laminated to layer 12 over substantially the entirety of the contiguous surfaces 12b and 13a.

As used herein, the term "laminated" shall mean "firmly united or adhered thereto". Accordingly, "laminated" shall not mean "readily dislodgeable or separable".

Layer 13 may be formed of any suitable heat-shrinkable plastic film, many of which are readily available commercially. One example of such a heat-shrinkable film is manufactured by DuPont de Nemours and sold under the trademark CLYSAR®. This film is an irradiated, linear low-density polyethylene heat-shrinkable film that is characterized by biaxial shrinkage (longitudinally and laterally) in substantially equal amounts in both directions. The preferred thickness of layer 13 formed of CLYSAR® film is 0.6 mil.

Another example of a heat-shrinkable film is manufactured by Turex, Inc. and sold under the designation "K100-60." This film is a high impact film with biaxial shrinkage. However, the film shrinks in unequal amounts in the two directions. The preferred thickness of layer 13 formed of K100-60 film is 2 mil.

The layer 13 is preferably laminated to layer 12 by heat lamination. However, such heat lamination must be achieved under conditions which preclude any significant premature shrinkage of layer 13. Since the heat-shrinking temperature of most heat-shrinkable films is lower than the bonding or heat-lamination temperature thereof, the heat-lamination must be effected under controlled conditions to be described hereinafter.

While it is most preferred that heat-shrinkable layer 13 be laminated to layer 12, FIG. 2 illustrates an alternate embodiment of a heat-shrinkable cushioning material 10' incorporating the present invention. Cushioning material 10' includes first layer 11' having cavities 11a' therein and a second layer 12' laminated to surface 11b' of layer 11'. A layer 13' of heat-shrinkable film is laminated to the apogees or perigees (crowns) of the cavities 11a' of first layer 11'.

A further embodiment of the present invention is illustrated in FIG. 3, in which like reference characters with double-prime notations are used to designated like elements. A heat-shrinkable cushioning material 10" includes a first layer 11" having cavities 11a" therein and a second layer 12" laminated to first major surface 11b41 of layer 11". A layer 13" of heat-shrinkable plastic film is adhesively laminated to layer 12" by a layer 14 of suitable adhesive.

While adhesive lamination is within the present invention, it is more expensive than heat-lamination. Therefore, adhesive lamination is less preferable from economic and processing standpoints.

Figure 5:
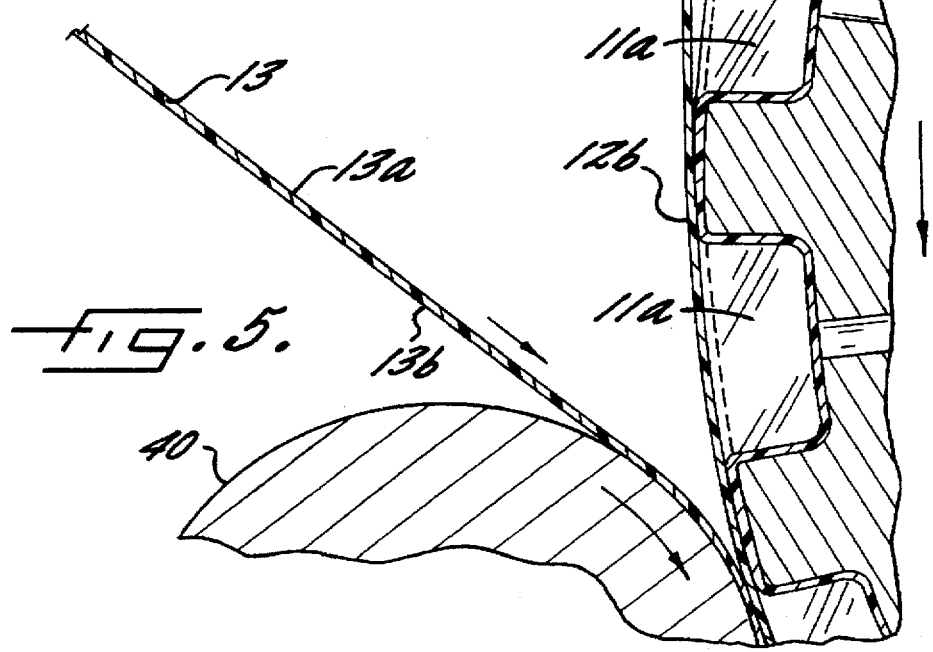
FIG. 5 is an enlarged, fragmentary sectional view of the lower medial portion of FIG. 4.

A preferred embodiment of the method of the present invention is illustrated in FIGS. 4 and 5. Air bubble protective packaging can be formed in many different ways by different methods. Examples of such methods are disclosed in U.S. Pat. Nos. 2,585,915; 2,776,451; 2,776,452; 3,026,231; 3,208,898; 3,285,793; 3,405,020; 3,416,984 and 5,116,444.

The coextrusion method disclosed in U.S. Pat. No. 5,116,444 is preferred and the disclosure of that patent is incorporated herein by reference. A first extruder 17 extrudes the first layer 11 of thermoplastic film into contact with the outer peripheral surface of an embossing roll 20 having cavities 21 in the outer surface thereof. Cavities 21 have openings 22 extending between the bottoms of the cavities 21 and a chamber 23 inside embossing roll 20. Chamber 23 has a vacuum drawn thereon in a manner not shown. The vacuum drawn on cavities 21 through openings 22 draws portions Of the first layer 11 into the cavities 21 to form concave cavities 11a in the first layer 11.

A second extruder 30 extrudes a second layer 12 of thermoplastic film onto the surface of embossing roll 20 at a location spaced downstream of the location at which the first layer 11 contacts embossing roll 20 so that the second layer 12 is brought into superposed relation to the first layer 11 after the cavities 11a are formed therein. Because of the heated nature of the first and second layers 11 and 12, the second layer 12 will be almost instantly laminated to the first layer 11 over their contiguous surfaces entrapping air in the cavities 11a and forming the multiplicity of spaced apart air bubbles.

The layer 13 of heat shrinkable plastic film is fed from a roll 35 onto the embossing roll 20 and into superposed relation to the second layer 12 at a location sufficiently close to the extruder 30 such that layer 12 still retains sufficient residual heat to heat laminate the heat-shrinkable layer 13 to layer 12.

To prevent premature shrinkage of the layer 13, a cooling roller 40 contacts the outside surface 13b of layer 13 immediately prior to the point of first contact of layer 13 with layer 12 and during lamination thereof. Cooling roller 40 has a coolant circulated therethrough in a manner not shown, but which is conventional to chill the outer periphery of the roll 40. The cooling roll 40 prevents the residual heat in layer 12 from penetrating into layer 13 and causing premature shrinkage while still permitting lamination of the two contiguous surfaces 12b and 13a of the two layers 12 and 13. The cooling roller 40 also cools the layer 12 sufficiently so that there is insufficient residual heat in layer 12 after lamination thereof to layer 13 to cause layer 13 to shrink prematurely.

For the embodiment illustrated in FIG. 2, the air bubble protective packaging formed by layers 11' and 12' is preformed. Thereafter, the crowns of the cavities 11a' of layer 11' are heated in any suitable manner (not shown), such as by a heat gun to soften the plastic. Immediately thereafter, the heat-shrinkable layer 13' is fed into contact with the softened crowns of cavities 11a to heat laminate the layer 13' thereto. A suitable chilling roll (not shown) would be employed to prevent premature shrinkage of the layer 13'.

As for the embodiment illustrated in FIG. 3, the layer 13" has the layer 14 of adhesive applied thereto at some place prior to lamination. The air bubble protective packaging is preformed by laminating layers 11" and 12" together. Layer 13" is then pressed against layer 12" with the adhesive layer 14 therebetween.

In the drawings and specification there has been set forth a preferred embodiment of the invention, and although specific terms are employed, they are used in a generic and descriptive sense only and not for purposes of limitation.

That which is claimed is:

1. A flexible cushioning material characterized by being heat-shrinkable to enclose tightly and cushion articles about which said cushioning material is wrapped, said cushioning material comprising first and second layers of plastic film laminated together and defining a multiplicity of spaced apart, gas filled bubbles therebetween, and a layer of heat-shrinkable plastic film disposed in superposed relation to one of said first and second layers such that adjacent surfaces thereof are contiguous, at least portions of said contiguous surfaces thereof being laminated together whereby the cushioning material is adapted to be wrapped about an article and then heated to shrink said heat-shrinkable layer such that said cushioning material tightly encloses and cushions the article.

2. A flexible cushioning material according to claim 1 wherein said heat-shrinkable layer is heat laminated to one of said first and second layers without premature shrinkage thereof.

3. A flexible cushioning material according to claim 1 wherein said heat-shrinkable layer is adhesively laminated to one of said first and second layers.

4. A flexible cushioning material according to claim 1 wherein said heat-shrinkable layer is biaxially heat-shrinkable.

5. A flexible cushioning material characterized by being heat-shrinkable to enclose tightly and cushion articles about which said cushioning material is wrapped, said cushioning material comprising a first layer of plastic film having a plurality of spaced apart concave cavities formed therein, said cavities having openings thereinto communicating with a first major surface of said first layer, a second layer of plastic film having a first major surface thereof laminated to said first major surface of said first layer, said second layer closing the openings into said cavities and entrapping air in said cavities to define with said first layer a multiplicity of spaced apart, air filled bubbles, and a layer of heat-shrinkable plastic film having one major surface thereof heat laminated to an outer surface of at least one of said first and second layers without premature shrinkage of said heat shrinkable layer, whereby said cushioning material is adapted to be wrapped about an article and then heated to shrink said heat-shrinkable layer so that said cushioning material tightly encloses and cushions the article.

6. A flexible cushioning material according to claim 5 wherein said heat-shrinkable layer is laminated to the outer surface of said second layer.

7. A flexible cushioning material according to claim 5 wherein said heat-shrinkable layer is laminated to the outer surface of the cavities in said first layer.

8. A method of forming a heat-shrinkable flexible cushioning material comprising providing an air bubble protective packaging web having two opposing outside surfaces, placing a layer of heat-shrinkable plastic film in superposed relation to one of the outside surfaces of the air bubble protective packaging web such that adjacent surfaces are contiguous, and laminating the contiguous surface of the heat-shrinkable layer to the contiguous surface of the air bubble protective packaging web.

9. A method according to claim 8 wherein the heat-shrinkable layer is heat-laminated to the air bubble protective packaging web without premature shrinkage thereof.

10. A method according to claim 9 wherein the contiguous surface of the air bubble protective packaging web has sufficient heat therein when the heat-shrinkable layer is placed thereon to laminate the contiguous surfaces together.

11. A method according to claim 10 wherein the air bubble protective packaging web is provided by co-extrusion of first and second layers while air bubbles are formed therein and the heat-shrinkable layer is laminated thereto by residual heat in the air bubble protective packaging web.

12. A method according to claim 10 wherein the contiguous surface of the air bubble protective packaging web is heated prior to placement of the heat-shrinkable layer thereon.

13. A method according to claim 10 wherein the surface of the heat-shrinkable layer opposite the contiguous surface thereof is cooled during lamination of the contiguous surfaces together to prevent premature shrinkage of the heat-shrinkable layer.

14. A method of forming a flexible cushioning material characterized by being heat-shrinkable to enclose tightly and cushion articles about which the cushioning material is wrapped, said method comprising providing first and second layers of plastic film, forming a plurality of concave cavities in the first layer of plastic film with the cavities having openings thereinto in a first major surface of the first layer of plastic film, laminating a first major surface of the second layer to the first major surface of the first layer of plastic film to close the openings into the cavities and to entrap air therein to form with the first layer a multiplicity of spaced apart, air filled bubbles, and laminating a layer of heat-shrinkable plastic film to an outer surface of one of the first and second plastic films.

15. A method according to claim 13 wherein the layer of heat-shrinkable plastic film is heat laminated to the outer surface of one of the first and second layers without premature shrinkage thereof.

16. A method according to claim 14 wherein the heat-shrinkable layer is placed in superposed relation to one of the first and second layers such that adjacent surfaces thereof are contiguous, and the contiguous surfaces are laminated together by residual heat in said one of the first and second layers.

17. A method according to claim 15 wherein premature shrinkage of the heat-shrinkable layer is prevented by cooling the surface of the heat-shrinkable layer opposite the contiguous surface thereof during lamination of the contiguous surfaces together.

\* \* \* \* \*

UNITED STATES PATENT AND TRADEMARK OFFICE
CERTIFICATE OF CORRECTION

PATENT NO. : 5,665,456
DATED : September 9, 1997
INVENTOR(S) : Kannankeril et al.

It is certified that error appears in the above-identified patent and that said Letters Patent is hereby corrected as shown below:

On the title page, Column 2, under "References Cited, U.S. PATENT DOCUMENTS", the following references should be included:

| | | | |
|---|---|---|---|
| -- | 2,585,915 | 02/19/52 | Chavannes |
| | 2,776,451 | 01/08/57 | Chavannes |
| | 2,776,452 | 01/08/57 | Chavannes |
| | 3,026,231 | 03/20/62 | Chavannes |
| | 3,208,898 | 09/28/65 | Chavannes et al. |
| | 3,285,793 | 11/15/66 | Chavannes |
| | 3,405,020 | 10/08/68 | Chavannes |
| | 3,416,984 | 12/17/68 | Chavannes et al. |
| | 4,894,265 | 01/16/90 | Chang et al. |
| | 5,116,444 | 05/26/92 | Fox |
| | 5,188,691 | 02/23/93 | Caputo -- |

Column 3, lines 25-28, "includes first layer 11' having cavities 11a' *therein and a second layer 12*laminated to surface 11b' *of layer 11'*. A layer 13' of heat-shrinkable film is laminated to the apogees or perigees (crowns) of the cavities 11a' *of first layer 11'*." should be -- includes first layer 11' having cavities 11a' therein and a second layer 12 laminated to surface 11b' of layer 11'. A layer 13' of heat-shrinkable film is laminated to the apogees or perigees (crowns) of the cavities 11a' of first layer 11'. --;

UNITED STATES PATENT AND TRADEMARK OFFICE
CERTIFICATE OF CORRECTION

PATENT NO. : 5,665,456
DATED : September 9, 1997
INVENTOR(S) : Kannankeril et al.

It is certified that error appears in the above-identified patent and that said Letters Patent is hereby corrected as shown below:

Column 3, line 31, "designated" should be -- designate --;

Column 3, line 34, "11b41" should be -- 11b" --;

Column 3, line 58, "Of" should be -- of --; and

Column 4, line 31, "11a" should be -- 11a' --.

Signed and Sealed this

Fourth Day of August, 1998

Attest:

BRUCE LEHMAN

Attesting Officer

Commissioner of Patents and Trademarks